United States Patent
Clark et al.

(10) Patent No.: US 8,763,105 B1
(45) Date of Patent: *Jun. 24, 2014

(54) KEYFOB FOR USE WITH MULTIPLE AUTHENTICATION ENTITIES

(75) Inventors: Gilbert W. Clark, Los Gatos, CA (US); Michael J. Graves, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 603 days.

This patent is subject to a terminal disclaimer.

(21) Appl. No.: 12/620,492

(22) Filed: Nov. 17, 2009

Related U.S. Application Data

(63) Continuation of application No. 11/067,199, filed on Feb. 24, 2005, now Pat. No. 7,624,433.

(51) Int. Cl.
*G06F 21/34* (2013.01)

(52) U.S. Cl.
USPC .................................. 726/9; 726/2

(58) Field of Classification Search
USPC ....................................... 726/2, 9
See application file for complete search history.

(56) References Cited

U.S. PATENT DOCUMENTS

| | | | |
|---|---|---|---|
| 7,478,434 B1 * | 1/2009 | Hinton et al. ................ | 726/27 |
| 7,502,933 B2 * | 3/2009 | Jakobsson et al. ........... | 713/172 |
| 7,565,554 B2 * | 7/2009 | Joosten et al. ............... | 713/193 |
| 7,685,631 B1 * | 3/2010 | Paya et al. ................... | 726/8 |
| 7,899,753 B1 * | 3/2011 | Everhart ...................... | 705/67 |
| 2002/0116626 A1 * | 8/2002 | Wood ........................... | 713/200 |
| 2004/0128560 A1 * | 7/2004 | Challener et al. ........... | 713/202 |
| 2004/0181675 A1 * | 9/2004 | Hansen ........................ | 713/182 |
| 2005/0122210 A1 * | 6/2005 | Huseth et al. ............... | 340/5.53 |
| 2005/0160298 A1 * | 7/2005 | Reno ............................ | 713/202 |
| 2010/0222939 A1 * | 9/2010 | Namburu et al. ............ | 701/2 |

OTHER PUBLICATIONS

"RSA SecurID 6100 USB Token", [online], 2003, RSA Security Inc. [retrieved Jan. 21, 2005], http://www.rsasecurity.com/products/securid/datasheets/SIDUSB_DS_0303.pdf.
RSA USB Authenticator 6100' [online], 2005, RSA Security Inc., [retrieved Jan. 21, 2005], http://www.rsasecurity.com/node.asp?id=1219.
"RSA USB Authenticator 6100 Features and Benefits" [online], 2005, RSA Security Inc., [retrieved Jan. 21, 2005], http://www.rsasecurity.com/node.asp?id=1339.
"MetaPass Network Security Overview", [online], 2004, MetaPass Inc., [retrieved Dec. 9, 2004], http://www.metapass.com/products/index.html.

(Continued)

*Primary Examiner* — Amare F Tabor
(74) *Attorney, Agent, or Firm* — Park, Vaughan, Fleming & Dowler LLP

(57) ABSTRACT

A token generator such as a keyfob is used to access the computer of an authentication entity different from the authentication entity that issued the token generator. The token generator stores authentication entity identification information identifying the authentication entity that issued the token generator. The token generator causes a user computer to transmit an authentication request including such authentication entity identification information together with a token generated in synchronization with the authentication entity issuing the token generator, so that the authentication request can be routed to the appropriate authentication entity that issued the keyfob for validation. The authentication request can be sent directly to the authentication entity that issued the token generator. The authentication request can also be sent to the authentication entity that issued the token generator via another authentication entity to which the user computer attempts to access.

17 Claims, 8 Drawing Sheets

(56) References Cited

OTHER PUBLICATIONS

"MetaPass Digital Key" [online], 2004, MetaPass, Inc., [retrieved Dec. 9, 2004], http://metapass.com/products/digitalkey.html.
"MetaPass Administrator", [online], 2004, MetaPass, Inc., [retrieved Dec. 9, 2004], http://www.metapass.com/products/administrator.html.
"MetaPass Features & Benefits", [online], 2004, MetaPass, Inc., [retrieved Dec. 9, 2004], http://www.metapass.com/products/features.html.
"MetaPass Deployment", [online], 2004, MetaPass Inc., [retrieved Dec. 9, 2004], http://www.metapass.com/products/deployment.html.
"MetaPass Specifications", [online], 2004, MetaPass, Inc., [retrieved Dec. 9, 2004], http://www.metapass.com/products/specifications.html.

* cited by examiner

KEYFOB FOR USE WITH MULTIPLE AUTHENTICATION ENTITIES

RELATED APPLICATION

This application is a continuation application of application Ser. No. 11/067,199, entitled "Keyfob for Use with Multiple Authentication Entities," by inventors Gilbert W. Clark and Michael J. Graves, filed 24 Feb. 2005.

TECHNICAL FIELD

The present invention relates to keyfobs and, more specifically, to a keyfob that can be used to access the computers of multiple authentication entities.

BACKGROUND OF THE INVENTION

A keyfob is a type of a security token, typically a small hardware device with built-in authentication mechanisms for accessing computer systems. Similar to physical keys held on a real-world key chain, the authentication mechanisms in the keyfob control access to computer systems, computer network services and information stored therein. Conventional keyfobs typically are small hardware devices. Because a key fob is a physical object, it is easy for the owner to know if it has been stolen, unlike a password, providing better security for passwords.

Conventional keyfobs have mechanisms to generate a large number of tokens rotating in synchronization with an authentication entity that issued the keyfob. The keyfob maintains a synchronization mechanism within the keyfob device for synchronization of the tokens with the server of the authentication entity. These tokens rotate such that each token is valid temporarily for a limited duration. Thus, the temporary nature of the token provides an additional layer of security, because the token, even if it is known by a third party, will not be valid after the limited duration. At any given moment, the keyfob can display the token valid at that time. The user enters the displayed token to the application software of the user computer. The keyfob is validated when the token is validated by the authentication entity.

FIG. 1A is a block diagram illustrating how a conventional keyfob is used with computer systems to access the server of a financial institution (authentication entity), and FIG. 1B is an interaction diagram illustrating how the conventional keyfob is used with computer systems to access the server of a financial institution (authentication entity). For purposes of illustration, the example in FIGS. 1A and 1B illustrate a situation where a user of a financial application software running on a user computer 102 uses a conventional keyfob to access the server of a financial institution (FI) 103 such as a bank and download his financial data from the FI 103 to the financial application software. The FI 103 is associated with an authentication entity (AE1) 104 for authenticating keyfobs issued by the FI 103. Although the server of the FI 103 and the computer of AE1 104 are shown as separate computers in FIG. 1A, this is merely for illustration and they can also be part of one computer performing the functions of both the FI 103 and AE1 104. The FI 103 typically issues the keyfob to the user so that the user can access the FI's computer to engage in financial transactions with the FI 103, such as depositing, transferring, or withdrawing funds or downloading the user's financial data to third party's financial application software running on the user computer 102.

Referring to FIGS. 1A and 1B, in order for the application software on the user computer 102 to access the computer of the FI 103, the user enters 103 the keyfob token displayed on the keyfob to the user computer 102 running the application software, together with login information such as the login ID and password of the user's account with the FI 103. The displayed token is the one valid at that time and selected from the plurality of tokens rotating in synchronization with the authentication entity 103.

The application software on the user computer 102 transmits 105 an authentication request to the FI 103 and AE1 104. The authentication request includes at least the keyfob token. The authentication entity (AE1) 104 validates 106 the keyfob token, and the user is granted access to the computer of the FI 103.

A problem arises when the user has accounts with multiple different financial institutions. If the conventional keyfob is to be used, each of the financial institutions (authentication entities) issues its own keyfob to the user, and thus the user will have multiple keyfobs. The user has to physically carry the multiple keyfobs, which is very inconvenient for the user and also poses a security concern as some of the many keyfobs may be lost.

Therefore, there is a need for a keyfob that can be used with multiple authentication entities. There is also a need for a method for an authentication entity to authenticate a keyfob that was issued by another authentication entity.

SUMMARY OF THE INVENTION

The present invention provides a token generator, such as a keyfob, that stores authentication entity identification information identifying the authentication entity that issued the keyfob. The keyfob can be used to access a computer associated with an authentication entity different from the authentication entity that issued the token generator. The token generator generates a token selected from a plurality of tokens in synchronization with the authentication entity that issued the token generator. The token generator causes a user computer with which the token generator communicates to transmit an authentication request including the token and the authentication entity identification information (AEID), so that the authentication request can be routed to the appropriate authentication entity that issued the token generator for validation of the token generator.

In a first embodiment of the present invention, the authentication request is transmitted from a user computer with which the token generator communicates to the computer of a first authentication entity that the user computer attempts to access, although the token generator was issued by a second authentication entity different from the first authentication entity. The computer of the first authentication entity forwards the authentication request to the computer of the second authentication entity as identified by the authentication entity identification information. The second authentication entity validates the token based on the token, and the user computer is allowed access to the computer corresponding to the first authentication entity.

In a second embodiment of the present invention, the token generator is capable of generating a first token and a second token in synchronization with a first authentication entity and a second authentication entity, respectively, and stores a first AEID and a second AEID identifying the first and second authentication entities, respectively. When the user computer attempts to access a first computer corresponding to the first authentication entity, the token generator causes application software running on the user computer with which the token generator communicates to select the first token among the first and second tokens and the first AEID among the first and second AEIDs. The user computer transmits an authentication request including the first token and the first AEID to the first computer. Upon validation of the token generator by the first computer, the user computer is allowed access to the first computer.

In a third embodiment of the present invention, the token generator is capable of generating a first token and a second token in synchronization with a first authentication entity and a second authentication entity, respectively, and stores a first AEID and a second AEID identifying the first and second authentication entities, respectively. However, the user computer attempts to access a third computer corresponding to a third authentication entity not associated with the first and second AEIDs. In this embodiment, the user computer with which the token generator communicates can still select the first token and the first AEID. The token generator causes the user computer to transmit an authentication request including the first token and the first AEID to the third computer. The third computer forwards the authentication request to the first computer identified by the first AEID. The first authentication entity validates the token generator based on the first token, and the user computer is allowed access to the third computer.

In a fourth embodiment of the present invention, the authentication request is transmitted from a user computer with which the token generator communicates directly to the second computer corresponding to the second authentication entity as identified by the authentication entity identification information, although the token generator is used for accessing a first computer corresponding to a first authentication entity. The second authentication entity validates the token generator based on the token and generates a password, which is provided directly to the user via the user computer. When the user enters the password to the user computer, the user computer transmits the password to the first computer together with the authentication entity identification information. The first computer forwards the password to the second computer, and the second authentication entity confirms that the password is valid, at which point the user is allowed access to the first computer.

The token generator includes a communication module, such as a Universal Serial Bus (USB) interface, for communication with the user computer, a memory module storing the authentication entity identification information, synchronization software for generating tokens in synchronization with the authentication entities, and authentication software for causing the user computer to perform authentication of the token generator. The token generator also includes a controller for controlling the communication module and the memory module and for running the synchronization software and the authentication software. The token generator may take any physical shape, for example, the shape of a physical key. In one embodiment the keyfob is of a shape and size that makes it convenient to attach to a key ring and carry in one's pocket or purse. The authentication requests are transmitted from the user computer to the first authentication entity or the second authentication entity via a data communication network such as the Internet.

The token generator of the present invention has the advantage that the token generator can be used with multiple authentication entities including authentication entities other than the one that issued the token generator. Therefore, the token generator user does not have to carry multiple token generators. The methods of the present invention for authenticating the token generator can be embodied in a computer program product stored on a computer readable medium.

BRIEF DESCRIPTION OF THE DRAWINGS

The teachings of the present invention can be readily understood by considering the following detailed description in conjunction with the accompanying drawings. Like reference numerals are used for like elements in the accompanying drawings.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Figure 1A:
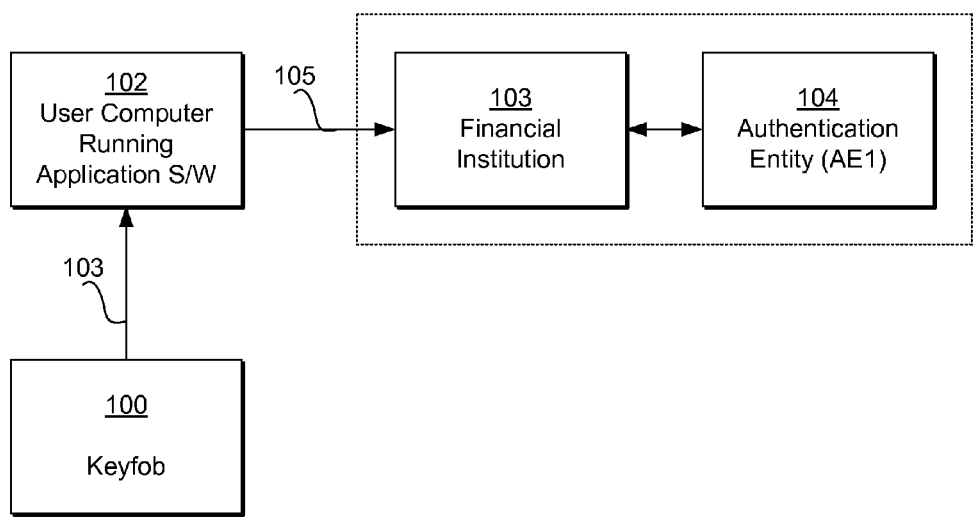
FIG. 1A is a block diagram illustrating how a conventional keyfob is used with computer systems to access the computer of a financial institution (authentication entity).
Figure 1B:
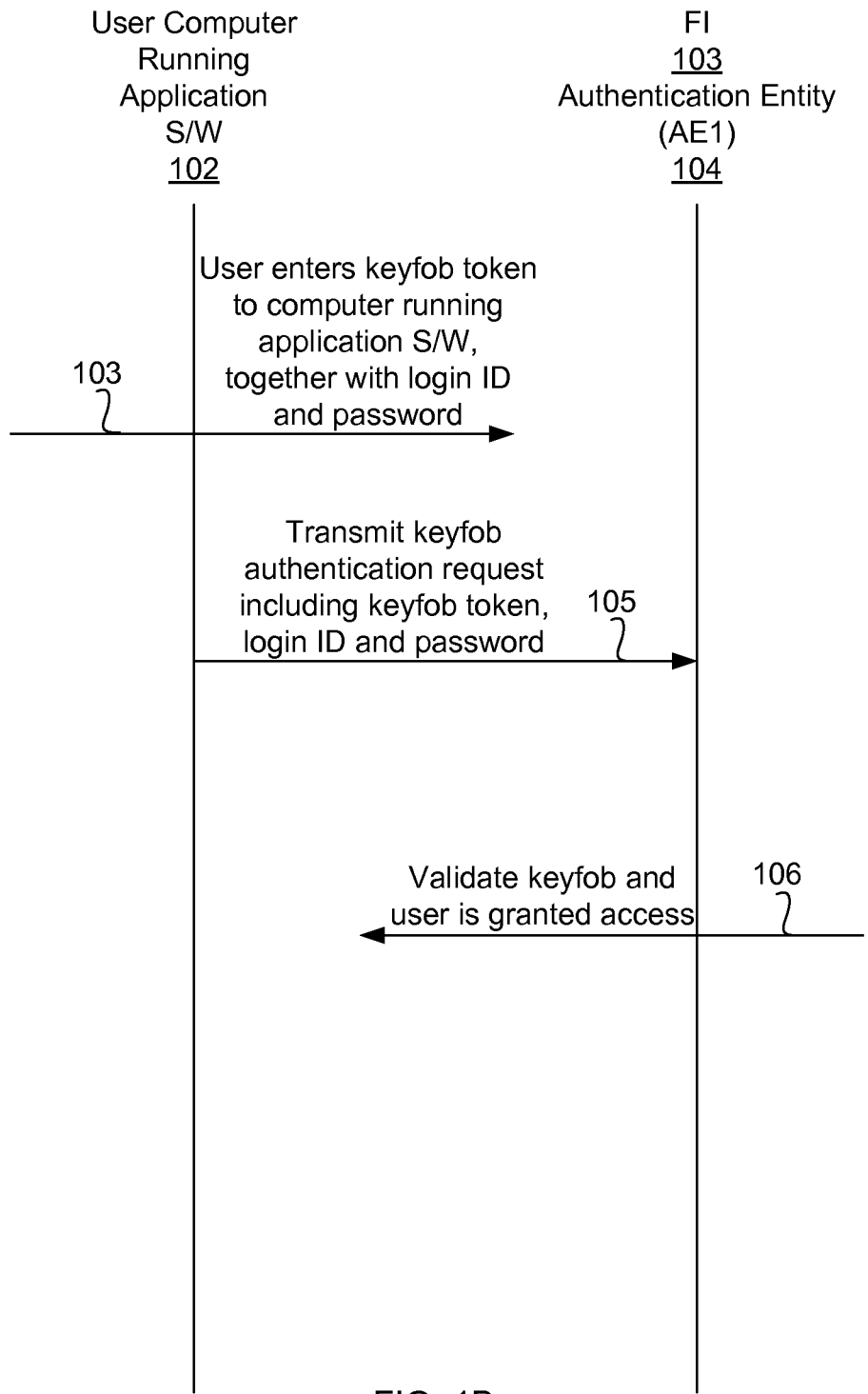
FIG. 1B is an interaction diagram illustrating how a conventional keyfob is used with computer systems to access the computer of a financial institution (authentication entity).
Figure 2A:
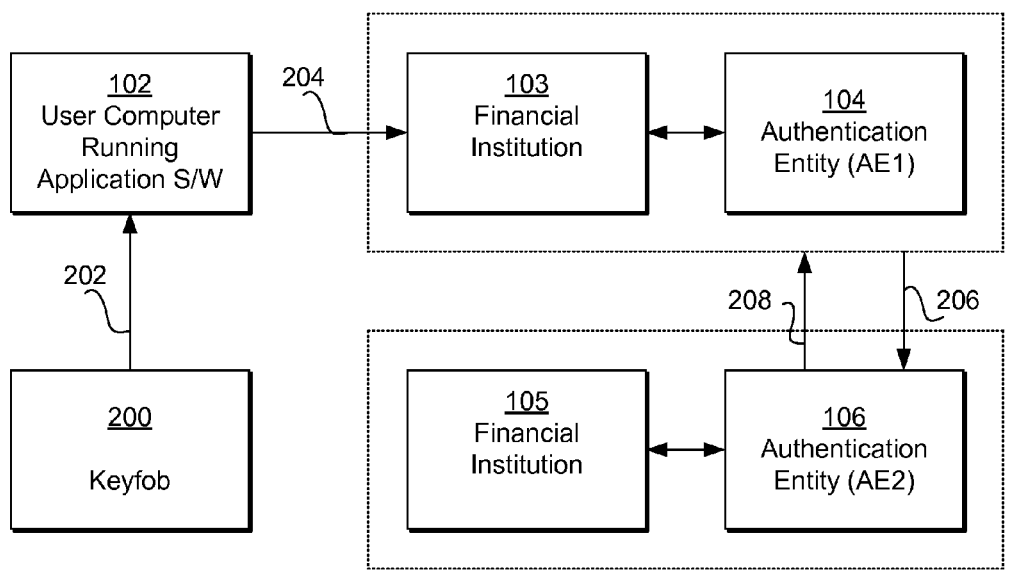
FIG. 2A is a block diagram illustrating how a keyfob is used with a computer system to access the computer of a financial institution (authentication entity) where the keyfob was issued by another authentication entity, according to a first embodiment of the present invention.
Figure 2B:
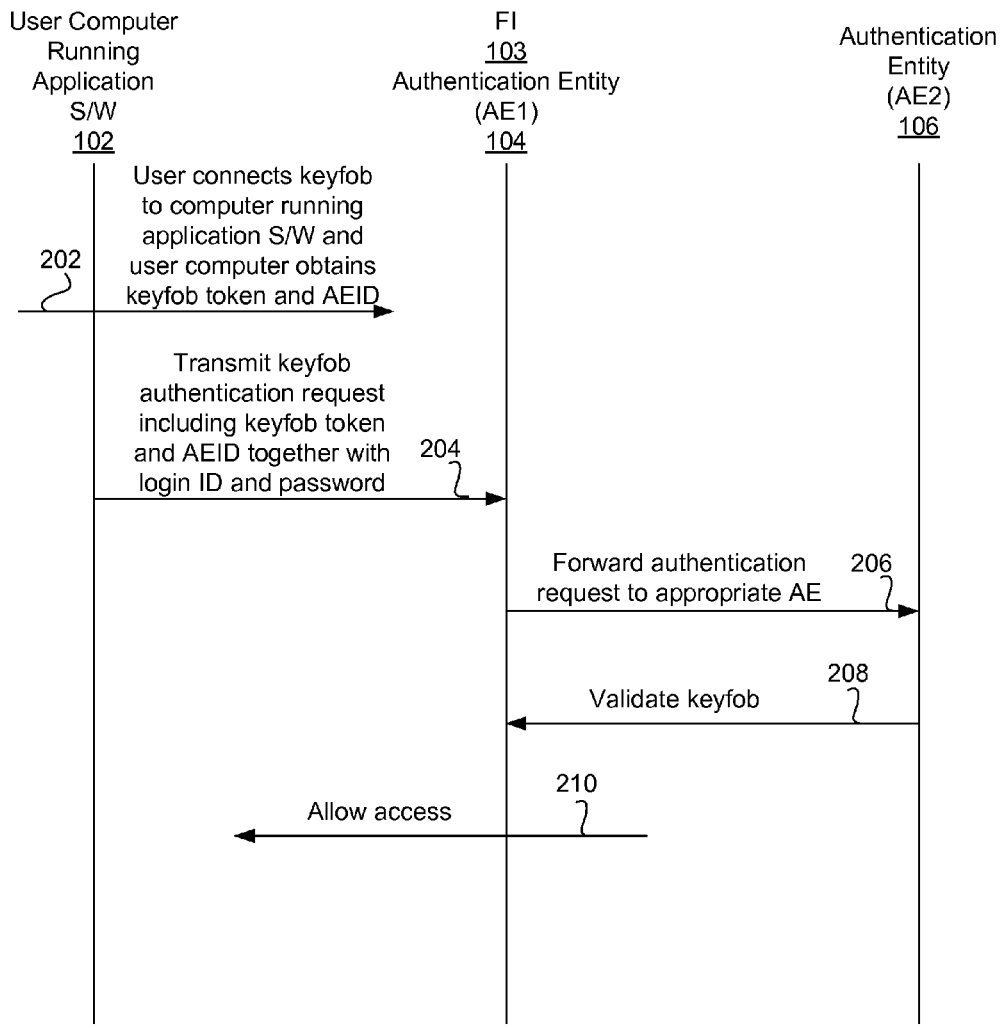
FIG. 2B is an interaction diagram illustrating how a keyfob is used with a computer system to access the computer of a financial institution (authentication entity) where the keyfob was issued by another authentication entity, according to the first embodiment of the present invention.

FIG. 2A is a block diagram and FIG. 2B is an interaction diagram, both illustrating how a keyfob is used with a computer system to access the computer of a financial institution (authentication entity) where the keyfob was issued by another authentication entity, according to a first embodiment of the present invention. For purposes of illustration, the embodiment in FIGS. 2A and 2B illustrate a situation where a user of a financial application software, such as Quicken® marketed by Intuit Inc. of Mountain View, Calif., running on a user computer 102 accesses the computer of a financial institution (FI) 103 such as a bank associated with an authentication entity (AE1) 104 and downloads his financial data from the FI 103 to the financial application software, using a keyfob issued by another Authentication Entity (AE2) 106. Although the keyfob was issued by the Authentication Entity (AE2) 106, the Authentication Entity (AE1) 104 is capable of authenticating the keyfob through the Authentication Entity (AE2) 106.

Referring to FIGS. 2A and 2B, in order for the application software on the user computer 102 to access the computer of the FI 103, the user connects 202 the keyfob 200 to the user computer 102, by which the user computer obtains the keyfob token and authentication entity identification information (AEID) associated with and stored in the keyfob 200. The connection of the keyfob 200 to the user computer 102 is typically done by a USB interface, although other types of communication mechanisms can be used. For example, in one embodiment wireless communication is used. In one embodiment, the application software can have the functionality for obtaining the keyfob token and AEID from the keyfob 200. In another embodiment, the authentication software stored in the keyfob 200 may have the functionality for providing the keyfob token and AEID to the application software.

The application software causes the user computer 102 to transmit 204 a keyfob authentication request to the computer of the FI 103 and/or the authentication entity (AE1) 104. The authentication request includes the keyfob token and the AIED. The FI 103 and/or authentication entity (AE1) 104 forwards 206 the authentication request to the appropriate authentication entity (AE2) 106 associated with the AEID through a communication network such as the Internet. This is possible because the keyfob 200 stores the AEID.

The authentication entity (AE2) validates 208 the keyfob by determining whether the keyfob token is valid at that time, and transmits such validation to the FI 103 and/or authentication entity (AE1) 104. As a result, the user is allowed 210 access to the FI 103. Although the example in FIGS. 2A and 2B illustrates the situation where the authentication entity (AE1) 104 is not the authentication entity associated with the AEID, it should be understood that the authentication request need not be forwarded if the authentication entity (AE1) 104 is indeed the authentication entity associated with the AEID because the authentication entity (AE1) 104 itself can validate the keyfob in such situations. In addition, it is also possible that the authentication entity (AE2) 106 is independent of the FI 105 such that the authentication entity (AE2) 106 is not associated with the FI 105.

Figure 2C:
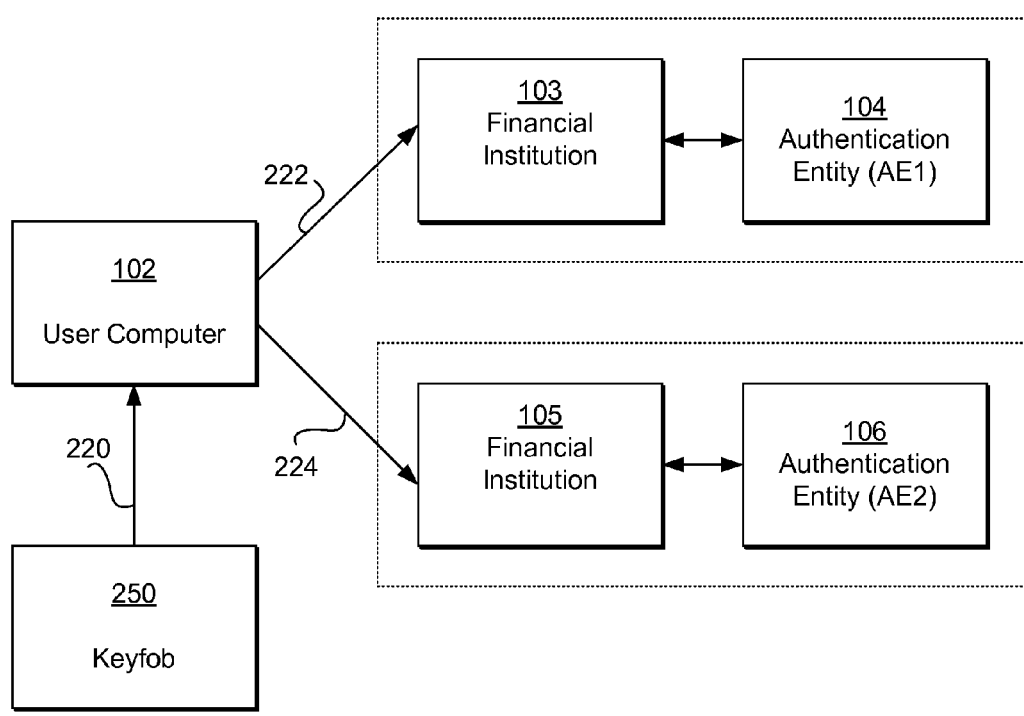
FIG. 2C is a block diagram illustrating how a keyfob is used with a computer system to access the computer of a financial institution (authentication entity), according to a second embodiment of the present invention.

FIG. 2C is a block diagram illustrating how a keyfob 250 is used with a computer system to access the computer of a financial institution (authentication entity), according to a second embodiment of the present invention. The keyfob 250 in FIG. 2B is different from the keyfob 200 in FIG. 2A in that it stores AEIDs associated with a plurality of authentication entities 104, 106 and includes mechanisms for generating keyfob tokens associated with and in synchronization with the plurality of authentication entities 104, 106. Each keyfob token is generated in synchronization with the authentication entity corresponding to its associated AEID. Therefore, the keyfob 250 is capable of being validated by a plurality of authentication entities 104, 106 identified by the plurality of AEIDs.

Referring to FIG. 2C, the keyfob 250 has mechanisms for generating keyfob tokens in synchronization with both authentication entities 104, 106, and also stores the AEIDs corresponding to both authentication entities 104, 106. When the user connects 220 the keyfob 250 to the user computer 102, the application software running on the user computer 102 obtains the correct keyfob token (key) for authentication by either of the authentication entities 104, 106 associated with the computer 103, 105 that the application software is attempting to access. In one embodiment, these tokens (keys) for the multiple authentication entities 104, 106 may be stored in the keyfob 250, and one of the keys is obtained by the application software running on the user computer. In another embodiment, the authentication software stored in the keyfob 250 passes on both tokens for both of the authentication entities 104, 106 to the application software, and the application software selects the appropriate keyfob token. For example, if the application software attempts to access the computer of the financial institution 103, then it obtains the keyfob token and the AEID associated with the authentication entity (AE1) 104 associated with the financial institution 103. If the application software attempts to access the computer of the financial institution 105, then it obtains the keyfob token and the AEID associated with the authentication entity (AE2) 106 associated with the financial institution 105.

The application software on the user computer 102 transmits a keyfob authentication request 222, 224 to either of the authentication entities 104, 106. The keyfob authentication request includes at least the selected keyfob token and the selected AEID corresponding to the authentication entity with which the computer of the financial institution for access is associated. Therefore, the keyfob 250 of FIG. 2C has the advantage that the keyfob 250 can be used with multiple authentication entities without having to forward the keyfob authentication requests between the authentication entities.

Figure 2D:
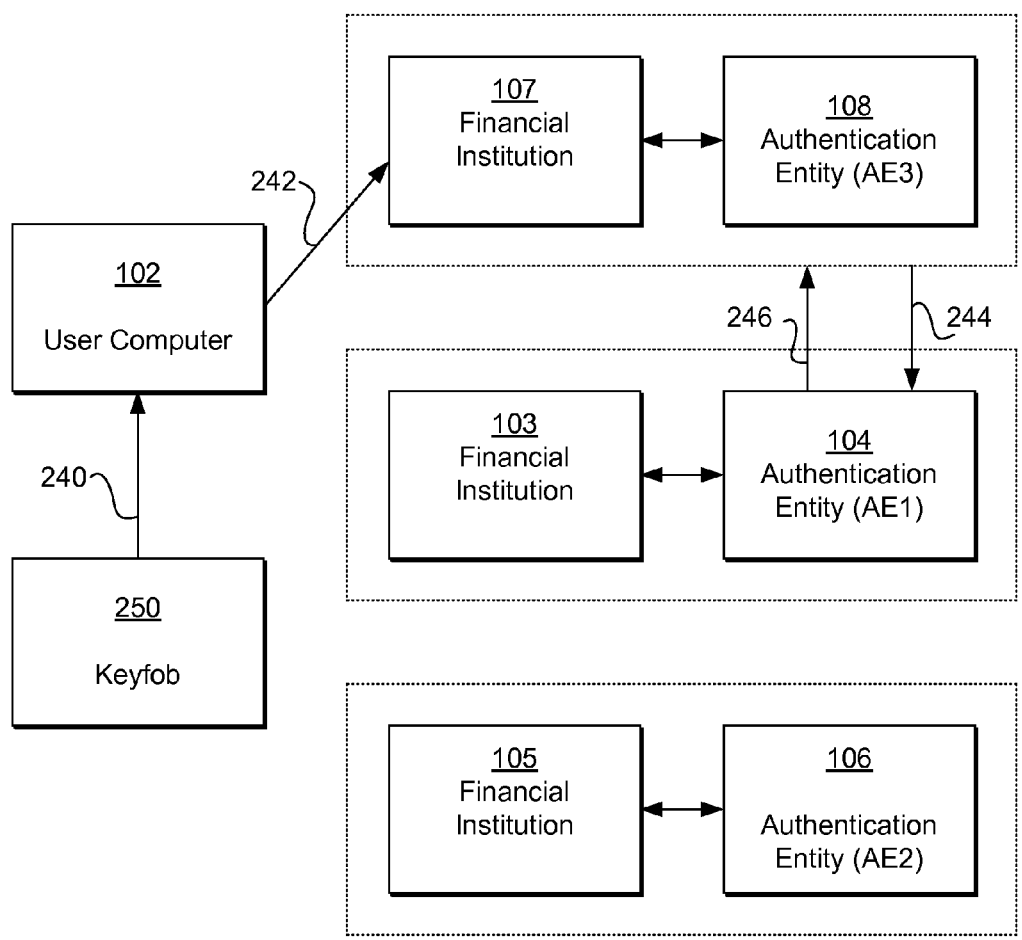
FIG. 2D is a block diagram illustrating how a keyfob is used with a computer system to access the computer of a financial institution (authentication entity), according to a third embodiment of the present invention.

FIG. 2D is a block diagram illustrating how a keyfob is used with a computer system to access the computer of a financial institution (authentication entity), according to a third embodiment of the present invention. The embodiment in FIG. 2D illustrates a situation where a keyfob 250 has mechanisms for generating tokens in synchronization with multiple authentication entities but not with the authentication entity that the application software running on the user computer 102 attempts to access.

Referring to FIG. 2D, the keyfob 250 has mechanisms for generating keyfob tokens in synchronization with both authentication entities 104, 106, and also stores the AEIDs corresponding to both authentication entities 104, 106. However, the keyfob 250 does not have mechanisms for generating tokens in synchronization with the authentication entity (AE3) 108. The authentication entity (AE3) 108 is the authentication entity associated with the financial institution 107 that the application software running on the user computer 102 attempts to access.

When the user connects 240 the keyfob 250 to the user computer 102, the application software determines that the keyfob 250 is not capable of generating keyfob tokens in synchronization with the authentication entity (AE3) 108. Nonetheless, the application software obtains one of the keyfob tokens (keys) together with the associated AEID for authentication by either of the authentication entities 104, 106 through forwarding.

The application software causes the user computer 102 to transmit 242 a keyfob authentication request to the computer of the FI 107 and/or the authentication entity (AE3) 108. The authentication request includes the keyfob token and the AIED corresponding to another one or all of the authentication entities 104, 106 in synchronization with the keyfob 250, e.g., the authentication entity (AE1) 104. There is an algorithm for determining which token (for AE1 104 or AE2 106) and AEID (for AE1 104 or AE2 106) should be selected based on, for example, the FI or AE that the user computer 102 is attempting to access, user input, or the issuer of the keyfob 250. Such algorithm can be included in software residing in the keyfob 250, the user computer 102, or at the FI 107. The FI 107 and/or authentication entity (AE3) 108 forwards 244 the authentication request to the appropriate authentication entity (AE1) 104 associated with the AEID through a communication network such as the Internet.

The authentication entity (AE1) 104 validates 246 the keyfob by determining whether the keyfob token is valid at that time, and transmits 246 such validation to the FI 107 and/or authentication entity (AE3) 108. As a result, the user is allowed access to the FI 107. Note that it is possible for the authentication entity (AE2) 106 and the authentication entity (AE1) 104 to be independent of the FI 105 and the FI 103 such that they are not associated with the FI 105 and the FI 103.

Figure 3:
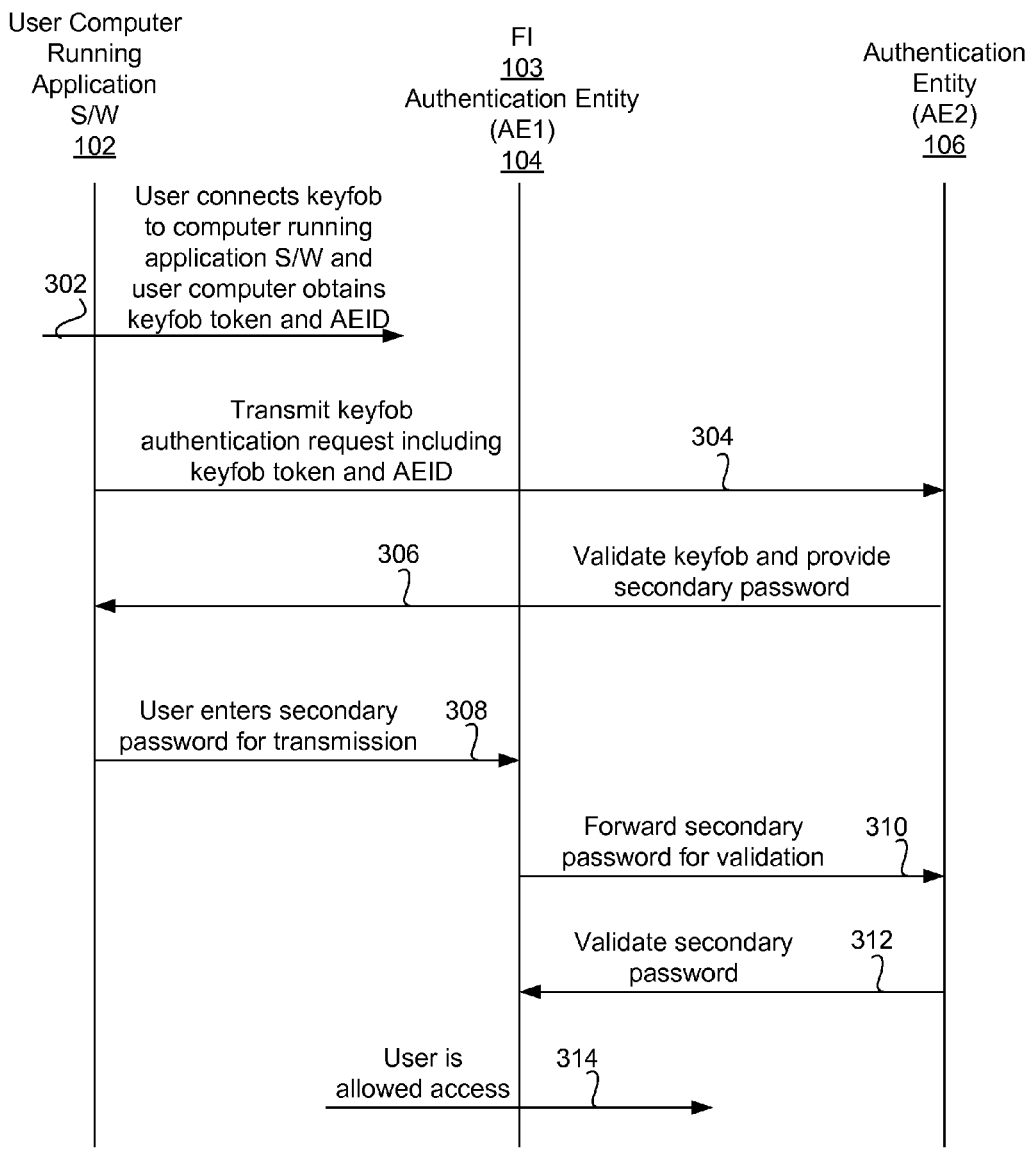
FIG. 3 is an interaction diagram illustrating how a keyfob is used with a computer system to access the computer of a financial institution (authentication entity) where the keyfob was issued by another authentication entity, according to a fourth embodiment of the present invention.

FIG. 3 is an interaction diagram illustrating how a keyfob is used with a computer system to access the computer of a financial institution (authentication entity) where the keyfob was issued by another authentication entity, according to a fourth embodiment of the present invention. The embodiment in FIG. 3 illustrates a situation where a user of a financial application software, such as Quicken® marketed by Intuit Inc. of Mountain View, Calif., running on a user computer 102 accesses the computer of a financial institution (Authentication Entity AE1) 104 such as a bank and downloads his financial data from the FI (AE1) 104 to the financial application software, using a keyfob issued by another Authentication Entity (AE2) 106. Although the keyfob was issued by the Authentication Entity (AE2) 106, the Authentication Entity (AE1) 104 is capable of authenticating the validity of the keyfob through the Authentication Entity (AE2) 106.

Referring to FIG. 3, in order for the application software running on the user computer 102 to connect to the server of the FI (AE1) 104, the user connects 302 the keyfob (not shown) to a user computer 102, typically the user's personal computer, running the application software, by which the user computer 102 obtains the keyfob token generated by the keyfob together with the AEID associated with the keyfob token.

In contrast to the embodiment of FIG. 2A, the user computer 102 running the application software transmits 304 a keyfob authentication request directly to the computer of the authentication entity (AE2) 106 that issued the keyfob through a communication network such as the Internet. The authentication request includes the keyfob token that is generated in synchronization with the authentication entity (AE2) 106 and the AEID identifying the authentication entity (AE2) 106 that issued the keyfob. Because the AEID is pre-stored in the keyfob itself, the authentication software stored in the keyfob is capable of causing the user computer 102 running the application software to transmit the authentication request directly to the appropriate authentication entity (AE2) 106 that issued the keyfob.

The authentication entity (AE2) 106 validates 306 the keyfob by checking the keyfob token, and issues 306 a secondary password to the user through the user computer 102. The secondary password also has a limited duration of validity, and may be displayed on the keyfob itself. The user enters 308 the secondary password to the user computer 102 together with login information such as login ID and password, which is transmitted 308 to the computer of the FI 103 or authentication entity (AE1) 104. The computer of the FI 103 or authentication entity (AE1) 104 forwards 310 the secondary password to the authentication entity (AE2) 106 associated with the AEID. The authentication entity (AE2) 106 validates 312 the secondary password if it is used within the limited validity period of the secondary password and transmits 312 such validation to the authentication entity (AE1) 104. As a result the user is allowed 314 access to the computer of the FI 103 or the authentication entity (AE1) 104, if other login information is correct.

Figure 4:
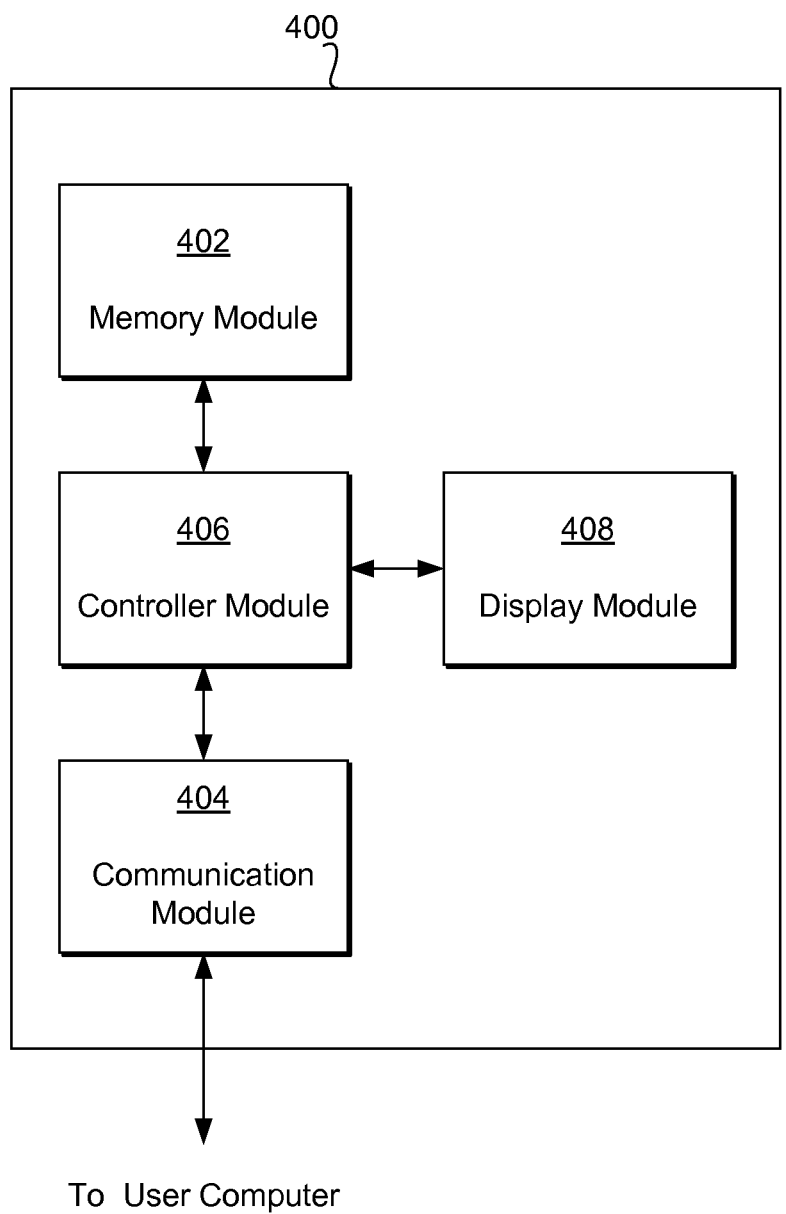
FIG. 4 is a block diagram illustrating the structure of a keyfob according to one embodiment of the present invention.

FIG. 4 is a block diagram illustrating a token generator 400, such as a keyfob, according to one embodiment of the present invention. The keyfob 400 may take the shape of a physical key or any other shape suitable for carrying with the user. The keyfob 400 includes a memory module 402, a controller module 406, a display module 408, and a communication module 404.

The memory module 402 stores the AEID identifying the authentication entity that issued the keyfob together with keyfob application software, including synchronization software that is configured to generate the keyfob token in synchronization with the authentication entity associated with the AEID and authentication software that is configured to perform the method of authenticating the keyfob as illustrated in, for example, FIGS. 2A-2D or FIG. 3. The communication module 404 is a communication interface such as a USB interface for data communication with the computer to which the keyfob is connected. In another embodiment, the communication module 404 is a wireless communication interface such as a Bluetooth interface, Wi-Fi interface, or a cellular telephone interface. The display module 408 may be any type of display device such as a liquid crystal display (LCD) panel, and displays the keyfob token generated by the keyfob 400 or secondary passwords provided by the authentication entities. The controller 406 is a microprocessor coupled to the memory module 402, the display module 408, and the communication module 404 for controlling their operation and for executing the keyfob application software stored in the memory module 406.

The keyfob of the present invention has the advantage that the keyfob can be used with multiple authentication entities including authentication entities other than the one that issued the keyfob. Therefore, the keyfob user does not have to carry multiple keyfobs. The methods of the present invention for authenticating the keyfob can be embodied in a computer program product stored on a computer readable medium.

Although the present invention has been described above with respect to several embodiments, various modifications can be made within the scope of the present invention. For example, although the embodiments of the present invention are illustrated herein with a keyfob, any hardware device or even computer software residing on the user computer may perform the functions of the token generator according to the present invention to the extent that they are capable of generating tokens in synchronization with the authentication entities and stores the relevant AEIDs. For example, the computer software may be token generation software that requires a thumbprint ID for authentication for initial use, with token generation functionalities such as those described herein. Accordingly, the disclosure of the present invention is intended to be illustrative, but not limiting, of the scope of the invention, which is set forth in the following claims.

What is claimed is:

1. A computer implemented method, the method comprising:

receiving an access request, wherein the access request comprises a token generated by a token generator in synchronization with an authentication entity, wherein the access request comprises an identifier for the authentication entity that is selected from a plurality of different identifiers for corresponding different authentication entities, and wherein the different identifiers are stored at the token generator;

in a local computer that serves as an authentication entity for authenticating access requests that comprise an identifier for the local computer, determining that the local computer is not the authentication entity corresponding to the token;

transmitting to the authentication entity an authentication request corresponding to the access request, thereby allowing the authentication entity to authenticate the access request based at least on the token; and responsive to the access request being authenticated, granting the access request.

2. The computer-implemented method of claim 1, wherein the token generator is a keyfob.

3. The computer-implemented method of claim 1, wherein the authentication request is transmitted to the authentication entity via Internet.

4. The computer-implemented method of claim 1, wherein determining that the local computer is not the authentication entity corresponding to the token comprises using the identifier for the authentication entity.

5. The method of claim 1, wherein determining that the local computer is not the authentication entity comprises using the local computer to compare the identifier for the authentication entity to the identifier for the local computer.

6. The method of claim 1, wherein granting access to the request comprises using the local computer to grant the access.

7. The method of claim 1, wherein, for each given authentication entity in the plurality of authentication entities, the token generator generates a token for the given authentication entity in synchronization with the given authentication entity.

8. The method of claim 1, wherein the identifier is selected from the plurality of different identifiers by using information for the access request.

9. A computer implemented method, the method comprising:
   receiving an authentication request from a server at an authentication entity which is different from the server, wherein the server serves as an authentication entity for authenticating access requests that comprise an identifier for the server;
   wherein the authentication request corresponds to an access request generated at a user computer for accessing the server, and wherein the authentication request comprises an identifier for the authentication entity that is selected from a plurality of different identifiers for corresponding different authentication entities; and
   wherein the authentication request comprises a token generated by a token generator in synchronization with the authentication entity, wherein the different identifiers are stored at the token generator;
   authenticating the access request based at least on the token; and
   transmitting the authentication to the server, thereby allowing the server to grant access in response to the access response.

10. The computer-implemented method of claim 9, wherein the token generator is a keyfob.

11. The computer-implemented method of claim 9, wherein the authentication is transmitted via Internet.

12. A computer system, comprising:
   a processor;
   a memory;
   a receiving mechanism configured to receive an access request;
   wherein the access request comprises a token generated by a token generator in synchronization with an authentication entity, wherein the access request comprises an identifier for the authentication entity that is selected from a plurality of different identifiers for corresponding different authentication entities, and wherein the different identifiers are stored at the token generator;
   a determination mechanism configured to determine that a local computer is not the authentication entity corresponding to the token, wherein in the local computer serves as an authentication entity for authenticating access requests that comprise an identifier for the local computer;
   a transmission mechanism configured to transmit to the authentication entity an authentication request corresponding to the access request, thereby allowing the authentication entity to authenticate the access request based at least on the token; and
   responsive to the access request being authenticated, granting the access request.

13. The computer system of claim 12, wherein the token generator is a keyfob.

14. The computer system of claim 12, wherein the authentication request is transmitted to the authentication entity via Internet.

15. An authentication system, comprising:
   a processor;
   a memory;
   a receiving mechanism configured to receive an authentication request from a server at the authentication entity which is different from the server, wherein the server serves as an authentication entity for authenticating access requests that comprise an identifier for the server;
   wherein the authentication request corresponds to an access request generated at a user computer for accessing the server, and wherein the authentication request comprises an identifier for the authentication entity that is selected from a plurality of different identifiers for corresponding different authentication entities; and
   wherein the authentication request comprises a token generated by a token generator in synchronization with the authentication entity, wherein the different identifiers are stored at the token generator;
   an authentication mechanism configured to authenticate the access request based at least on the token; and
   a transmission mechanism configured to transmit the authentication to the server, thereby allowing the server to grant access in response to the access response.

16. The authentication system of claim 15, wherein the token generator is a keyfob.

17. The authentication system of claim 15, wherein the authentication is transmitted via Internet.

* * * * *